Figure 1:
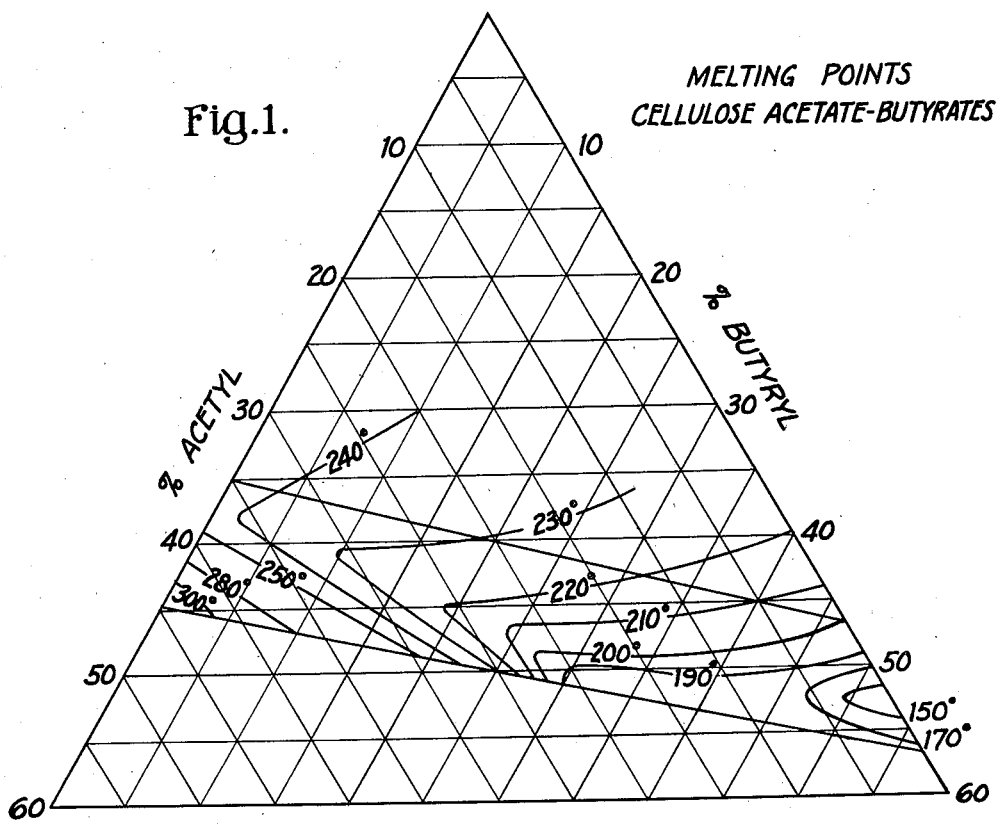

July 14, 1942.   C. J. MALM ET AL   2,289,792
PROCESS OF MANUFACTURE OF LAMINATED GLASS
Filed May 24, 1939

MELTING POINTS
CELLULOSE ACETATE-BUTYRATES

Inventors
Carl J. Malm
Gerard J. Clarke

Patented July 14, 1942

2,289,792

UNITED STATES PATENT OFFICE 2,289,792

PROCESS OF MANUFACTURE OF LAMINATED GLASS

Carl J. Malm and Gerard J. Clarke, Rochester, N. Y., assignors to Eastman Kodak Company, Rochester, N. Y., a corporation of New Jersey Application May 24, 1939, Serial No. 275,486

9 Claims. (Cl. 49—81.5)

This invention relates to the making of laminated glass in which a cellulose ester coating, melted onto the glass, is employed as the bonding layer. This invention also relates to laminated glass in which the bonding layer essentially consists of a cellulose ester having a melting point below 230° C. and not more than 25% of plasticizer, preferably none, while the sheet used for the inner layer comprises a transparent sheet of a compatible cellulose ester.

The prior art recognizes that cellulose acetate will only melt at a high temperature forming a dark-colored smeary mass. As a consequence, when laminated glass has been previously made, using cellulose acetate, the composition had a high plasticizer content and was joined together by means of heat and pressure, the plasticizer being present in sufficient amount to cause softening of the cellulose acetate at a comparatively low temperature. In laminated glass of this type, the inner cellulose ester material did not permanently adhere on bond to the glass, as shown by the breaking away of the cellulose ester material from the glass, in use.

Because of the poor adhesiveness of laminated glass in which a cellulose ester was the inner layer, the use of more adhesive bonding materials, such as resins or gelatin, to bind the cellulose ester to the glass has been suggested. The resins have exhibited discoloration due to non-resistance to ultra-violet light. Gelatin has the disadvantage that it is somewhat water susceptible.

An object of our invention is to provide a laminated glass in which the inner portion is made up of a cellulose ester composition but yet the inner layer firmly adheres to the glass. Another object of our invention is to provide a method of making laminated glass in which strong adherence is obtained without using any material susceptible to deterioration in use. Other objects of our invention will appear herein.

We have found that if the adjacent surfaces of two glass sheets are coated with a thin layer of a cellulose ester, having a melting point below 230° C. and a char point at least 40° C. above its melting point and containing either no plasticizer or an amount not more than 25% of plasticizer and the coating is melted onto the glass sheets, the resulting glass sheets may be firmly attached to a compatible cellulose ester inner layer, preferably having a high plasticizer content, to form a strong, transparent laminated glass. We have found that a cellulose ester layer, which is melted upon the surface of a glass sheet, as described, so resists removal from the glass that any attempt to peel it off from the glass sheet results in particles of glass being pulled out therefrom. We have found that a laminated glass, having an inner layer of a cellulose ester, with a high plasticizer content, bound to two glass sheets coated with a layer of a cellulose ester, which has been melted onto the glass sheets, is suitable for extended use without the clarity and transparency of the product being affected.

The bonding layer may be applied to the surfaces of the glass by first dissolving the cellulose ester in a suitable volatile solvent, such as acetone, methyl ethyl ketone, methylene chloride, ethylene chloride, or their mixture, with or without a lower aliphatic alcohol, benzene-alcohol and the like. This solution is applied to the glass surface, such as by spraying or spreading the solution thereon. The solvent is evaporated off either by subjecting to warm air or by allowing the glass to stand at room temperature for a sufficient time. There results a layer of the cellulose ester on the glass which has so little adherence it may even be peeled off therefrom. However, we have found that if the glass plate is then subjected to a temperature which will melt the cellulose ester but which is at least 40° C. below its char point for a sufficient time to cause the layer to become soft and pasty, a firmly adhering layer is formed on the surface of the glass, which layer is free of pores, pin holes or any other deformity. This layer, which firmly adheres to the glass, may then be readily bonded to a compatible cellulose ester inner layer, such as by moistening the surfaces of the inner layer with a softening liquid which may be either a swelling liquid or a solvent for the ester and then contacting under the influence of heat and pressure. A laminated glass results which retains its clarity in commercial use.

As an alternative to this procedure, although less preferred, the glass sheets may be heated to a temperature above the melting point of the ester but below its char point and a thin sheet of the ester may then be pressed against the hot surface, thereby melting the ester onto the surfaces of the mass. It is only necessary that the layer, which is applied to the surface of the glass, be just thick enough to satisfactorily form a bonding layer between the glass and the inner layer. For instance, a layer, having a thickness of .001", would ordinarily be sufficient, although, of course, one need not be restricted to layers this thin. Because of the nature of our process, however, it is preferred that the melted layer be not more than .005" thick.

The cellulose ester, which may be employed in making laminated glass in accordance with our invention, should be a stable cellulose ester having a melting point without a plasticizer of less than 230° C., which melting point should be at least 40° C. below its char point. A stable cellulose ester is regarded as one which will withstand heating for eight hours at 160° C. without darkening. The cellulose esters, having a melting point below 220° C., are preferred for our invention. In the melting operation, a temperature of 20 or 30° above the melting point of the ester is usually desirable, especially where the char point is much above the melting point, such as 70° above or more. Using a temperature of 20-30° above the melting point of the ester, the melting operation takes but one or two minutes. It is preferred that this operation be short, as even with the stable cellulose ester, continuous heating at a high temperature will cause deterioration. With the use of a temperature not much above the melting point of the ester for the melting operation, a little longer time is necessary, but with layers of the usual thickness, a time longer than four minutes is seldom, if ever, required.

We have found that a temperature of 230° C. is ordinarily quite suitable for the melting treatment to cause the ester to firmly adhere to the glass. The temperature employed in our process will usually be found within the range of 200-250° C., depending, of course, upon the particular ester which is employed. After the coating has become soft or pasty, the glass is allowed to cool and has a uniform, transparent coating thereon.

The cellulose esters, which we have found to be most suitable for our invention, are those which contain at least 20% of a fatty acid radical of at least three carbon atoms and which contain sufficient high acyl to assure a melting point of below 230° C. and preferably below 220° C. and of sufficient stability to have a char point at least 40° above the melting point and preferably above 260° C. The cellulose esters, which we have found to be most suitable for our invention, are cellulose acetate butyrate, containing over 25% butyryl, cellulose acetate propionate butyrate, containing over 30% propionyl and butyryl, cellulose propionate butyrate and cellulose butyrate. The butyryl can be replaced either partially or completely by higher acyl radicals, such as valeryl, caproyl, lauryl, stearyl or, in fact, by any higher acyl radical of above three carbon atoms. It is preferred to use the fully esterified ester or one which has been only slightly hydrolyzed, as the moisture resistance is higher and the melting point is usually lower than is the case with esters which have been hydrolyzed close to the diester or more.

The accompanying drawing consists of a graph showing the melting points of butyric acid esters of cellulose, if stable, according to the butyryl and acetyl contents (Fig. 1) and a drawing showing the composition of laminated glass in accordance with our invention. The graph of Fig. 1 indicates in a general way the butyrates which have a melting point below 230° C. and are therefore suitable, if stable, for our invention. This graph refers to stable cellulose esters and therefore the char point will be at least 40° C. above the melting point which indicates their suitability. The graph indicates relative melting points and should not be regarded as absolute as melting points depend on other factors than acetyl and butyryl contents.

Figure 2:
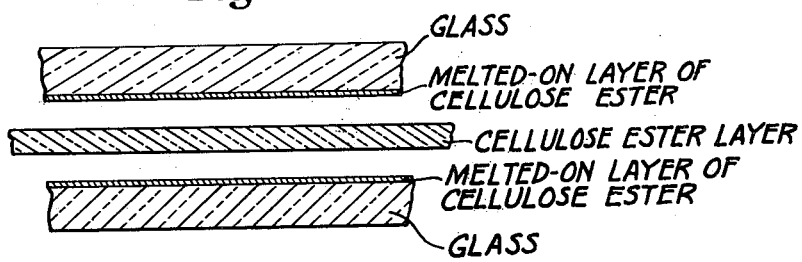

Fig. 2 illustrates the preferred make up of laminated glass in accordance with our invention. A layer of cellulose ester is melted on to the glass in accordance with our invention to form a bonding layer between the glass and a compatible cellulose ester layer. The melted-on layer has no plasticizer or a plasticizer content of not more than 25% (based on the ester) and the inner sheet has preferably though not necessarily a high plasticizer content such as at least 50% and preferably 100%.

It may be seen from Fig. 1 that the esters, having the lowest melting point, and, consequently, the most suitable for use in our invention are those in which butyryl predominates but which contain a small proportion of acetyl, such as approximately 30%-51% butyryl and 21-5% acetyl either fully esterified or from which some acyl has been hydrolyzed off.

The use of too large an amount of plasticizer is to be avoided in the compositions which are melted onto the surface of the glass. The presence of too much plasticizer therein interferes with the adhesion. An amount of plasticizer, above 25% of the cellulose ester, is undesirable, as the decrease in adhesion is particularly noticeable above this point. If plasticizer or any other compound is incorporated, it should be one which is stable at the temperature employed. Some of the plasticizers, which may be incorporated, are dibutyl sebacate, methyl stearate, triphenyl phosphate and diamyl phthalate. It is preferred that the layer melted onto the surface of the glass contain no plasticizer to assure the best adhesion.

The presence of resins in the bonding layer is undesirable, although possibly a few percent (such as up to 3%) may be tolerated without their deterioration giving sufficient discoloration to greatly impair the quality of the laminated glass. No more than this amount of resin will be defined as "substantially free of resin." It is preferred that the composition be completely free of resin.

As an example of making laminated glass, in accordance with our invention, the surface of the glass is first thinly coated with a solution of the cellulose ester, such as an acetone solution of a cellulose acetate butyrate having a butyryl content of 37% and 13% acetyl. Next the solvent is evaporated off and the layer is then caused to firmly adhere to the glass by subjecting it to a temperature of 230° C. for approximately two minutes or until the cellulose ester layer becomes soft and pasty. The glass is then allowed to cool. Two sheets of glass, each coated on one side with a coating which has been melted on as described, are taken and a transparent sheet of a compatible cellulose ester, such as cellulose acetate butyrate having a butyryl content of 37% and an acetyl content of 13%, the cellulose ester containing an equal amount of plasticizer, such as dibutyl sebacate, is moistened with a swelling agent or solvent, such as dibutyl phthalate, and placed between the two sheets of glass with the coated sides of the glass facing the cellulose ester sheet. The sandwich is then pressed together, such as in an autoclave, for instance, at a temperature of 135° C. and a pressure of 180-200 lbs. per square inch. Temperatures of 100°-200° C. may be employed, the usual practice in making laminated glass being suitable in this operation. The making of laminated glass, using an inner layer consisting of cellulose acetate butyrate sheeting and a considerable amount of plasticizer, as referred to, is more comprehensively described and claimed in the co-pending application Serial No. 275,482, of Malm and Conklin filed of even date.

Instead of first coating the glass plates and combining this coating with an inner layer, a sheet of a cellulose ester, having a melting point below 230° C. and preferably below 220° C. and a char point at least 40° C. above its melting point and having a plasticizer content of 10-25%, may be placed between two layers of glass and the sandwich may be then brought to the fusion temperature of the cellulose ester sheet. By this method, the cellulose ester adheres firmly to the glass and a strong lamination results without autoclaving being necessary. As an example, a sheet comprising cellulose tributyrate, which had been only slightly hydrolyzed, and 15% of di-iso-amyl phthalate (based on the cellulose ester) and having a thickness of .025", was placed between two pieces of plate glass and the sandwich was passed through several squeeze rolls to secure preliminary lamination. The mass was then subjected to a temperature of 200° C. for two minutes and then gradually cooled to temper. The resulting laminated glass was found to have a high break resistance and an excellent bond.

The esters which are really stable as indicated by their high char point are preferred for use in our process. The esters which we have found to be most suitable for use in the bonding layer in making laminated glass in accordance with our invention are those which have been stabilized such as by the method described and claimed in Malm and Kirton application Serial No. 254,492, filed Feb. 3, 1939.

The low viscosity esters have been found to be more economical in the making of the adhesive layer in accordance with our invention. The cellulose esters, as described, which have a viscosity of .1-2 seconds (4:1 acetone viscosity) have been found to be particularly suitable for forming an adhering layer on glass to bond the cellulose ester inner layer to the glass.

Any of the coating details which are not found herein are given in our copending application Serial No. 275,485 filed of even date.

If the use of a plasticizer is desired some types of plasticizers which can be used are:

1. Esters of organic dibasic acids and monohydric alcohols, particularly of the alcohols of at least 4 carbon atoms, such as diamyl phthalate, dibutyl phthalate and dibutyl sebacate.
2. Esters of aliphatic, long-chain fatty acids and monohydric alcohols such as methyl or ethyl stearate.
3. Esters of aliphatic long-chain alcohols and mono-basic acids such as cetyl acetate or cetyl propionate.
4. Esters of phosphoric acid and phenols or derivatives of phenols, such as triphenyl phosphate or tricresyl phosphate.
5. Esters of sugars and mono-basic acids such as sucrose octa-acetate or octa-propionate.

These plasticizers are stable, compatible, and of high molecular weight as regards the cellulose esters which we employ and are suitable for use in our invention in the proportion specified.

We claim:

1. A process of making laminated glass which comprises applying directly to at least one side of each of two sheets of glass a thin layer of a cellulose ester having a substantial content of fatty acid radicals of at least four carbon atoms and a span of approximately 40° C. between its melting point and its char point, subjecting the glass sheets to a temperature between the melting point and the char point of the cellulose ester for a sufficient time to cause the cellulose ester layer to become soft and pasty without detrimentally affecting the ester, cooling the glass sheets, inserting a compatible cellulose ester inner layer between the two sheets of glass adjacent the coated sides and sandwiching together by means of heat and pressure to form a permanently bonded sheet of laminated glass.

2. A process of making laminated glass which comprises applying directly to at least one side of each of two sheets of glass a layer of a composition comprising a cellulose ester having a butyryl content of at least 25%, having a span of at least 40° C. between its melting point and char point and less than 25% of plasticizer, based on the ester, subjecting the glass sheets to a temperature above the melting point of the ester but at least 40° C. below its char point to cause it to become soft and pasty without detrimentally affecting it, cooling, inserting a compatible cellulose ester inner layer between the two sheets of glass adjacent the coated sides and sandwiching together by means of heat and pressure to form a permanently bonded sheet of laminated glass.

3. A process of making laminated glass which comprises applying directly to at least one side of each of two sheets of glass a layer of a cellulose ester having a butyryl content of at least 25%, having a span of at least 40° C. between its melting point and char point and no plasticizer, subjecting the glass sheets to a temperature above the melting point of the ester but at least 40° C. below its char point to cause it to become soft and pasty without detrimentally affecting it, cooling, inserting a compatible cellulose ester inner layer between the two sheets of glass adjacent the coated sides and sandwiching together by means of heat and pressure to form a permanently bonded sheet of laminated glass.

4. A process of making laminated glass which comprises applying directly to at least one side of each of two sheets of glass a thin layer of a cellulose ester having a substantial content of fatty acid radicals of at least four carbon atoms and a span of approximately 40° C. between its melting point and its char point, subjecting the glass sheets to a temperature between the melting point and the char point of the cellulose ester for a sufficient time to cause the cellulose ester layer to become soft and pasty without detrimentally affecting the ester, cooling the glass sheets, inserting a compatible cellulose ester inner layer which has been moistened with a softening liquid between the two sheets of glass adjacent the coated sides and sandwiching together by means of heat and pressure to form a permanently bonded sheet of laminated glass.

5. A process of making laminated glass which comprises applying directly to at least one side of each of two sheets of glass a thin layer of a cellulose ester having a substantial content of fatty acid radicals of at least four carbon atoms and a span of approximately 40° C. between its melting point and its char point, subjecting the glass sheets to a temperature between the melting point and the char point of the cellulose ester for a sufficient time to cause the cellulose ester layer to become soft and pasty without detrimentally affecting the ester, allowing the glass sheets to cool, inserting a compatible cellulose ester inner layer between the two sheets of glass adjacent the coated sides and sandwiching together by means of heat and pressure to form a permanently bonded sheet of laminated glass.

6. A process of making laminated glass which comprises applying directly to at least one side of each of two sheets of glass a thin layer of a stable cellulose acetate butyrate containing 30-51% butyryl and 21-5% of acetyl, subjecting the glass sheets to a temperature above the melting point of the ester but at least 40° C. below its char point to cause the ester to become soft and pasty without detrimentally affecting the ester, cooling, inserting a compatible cellulose ester inner layer between the two sheets of glass adjacent the coated sides and sandwiching together by means of heat and pressure to form a permanently bonded sheet of laminated glass.

7. A process of making laminated glass which comprises applying directly to at least one side of each of two sheets of glass a thin layer of a stable cellulose acetate butyrate containing 30-51% butyryl and 21-5% of acetyl, subjecting the glass sheets to a temperature above the melting point of the ester but at least 40° C. below its char point to cause the ester to become soft and pasty without detrimentally affecting the ester, allowing the glass sheets to cool, inserting a compatible cellulose ester inner layer between the two sheets of glass adjacent the coated sides and sandwiching together by means of heat and pressure to form a permanently bonded sheet of laminated glass.

8. A process of making laminated glass which comprises applying directly to at least one side of each of two sheets of glass a thin layer of a stable cellulose acetate butyrate containing 30-51% butyryl and containing less than 25% of dibutyl sebacate, based on the ester, subjecting the glass sheets to a temperature above the melting point of the ester but at least 40° C. below its char point to cause the ester to become soft and pasty without detrimentally affecting the ester, allowing the glass sheets to cool, inserting a compatible cellulose ester inner layer between the two sheets of glass adjacent the coated sides and sandwiching together by means of heat and pressure to form a permanently bonded sheet of laminated glass.

9. A process of making laminated glass which comprises applying directly to at least one side of each of two sheets of glass a layer of a cellulose acetate butyrate having a butyryl content of 37% and an acetyl content of 13%, subjecting the glass sheets to a temperature above the melting point of the ester but at least 40° C. below its char point to cause the ester to become soft and pasty without detrimentally affecting it, allowing the glass sheets to cool, inserting a compatible cellulose ester inner layer between the two sheets of glass adjacent the coated sides and sandwiching together by means of heat and pressure to form a permanently bonded sheet of laminated glass.

CARL J. MALM.
GERARD J. CLARKE.